United States Patent
Hansen et al.

(10) Patent No.: US 8,609,787 B2
(45) Date of Patent: Dec. 17, 2013

(54) MOISTURE-CURABLE SILOXANE-CONTAINING COMPOUNDS AND FLUOROCARBON-CONTAINING COMPOUNDS AND POLYMERS FORMED THEREFROM

(75) Inventors: Richard G. Hansen, Mahtomedi, MN (US); David S. Hays, Woodbury, MN (US); Suresh Iyer, Woodbury, MN (US); John W. Frank, Cottage Grove, MN (US); Ramesh C. Kumar, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/518,460

(22) PCT Filed: Dec. 20, 2010

(86) PCT No.: PCT/US2010/061260
§ 371 (c)(1),
(2), (4) Date: Jun. 22, 2012

(87) PCT Pub. No.: WO2011/090643
PCT Pub. Date: Jul. 28, 2011

(65) Prior Publication Data
US 2013/0012667 A1      Jan. 10, 2013

Related U.S. Application Data

(60) Provisional application No. 61/290,925, filed on Dec. 30, 2009.

(51) Int. Cl.
*C08F 283/12* (2006.01)
*C08G 77/452* (2006.01)

(52) U.S. Cl.
USPC .......................................................... 525/474

(58) Field of Classification Search
USPC .......................................................... 525/474
See application file for complete search history.

(56) References Cited

U.S. PATENT DOCUMENTS

| | | | |
|---|---|---|---|
| 2,676,182 A | 4/1954 | Daudt | |
| 3,250,807 A | 5/1966 | Fritz | |
| 3,627,851 A | 12/1971 | Brady | |
| 3,772,247 A | 11/1973 | Flannigan | |
| 3,810,874 A | 5/1974 | Mitsch | |
| 3,890,269 A | 6/1975 | Martin | |
| 4,085,137 A * | 4/1978 | Mitsch et al. | 428/835.8 |
| 4,119,615 A * | 10/1978 | Schulze | 528/343 |
| 4,661,577 A | 4/1987 | Jo Lane | |
| 4,707,531 A | 11/1987 | Shirahata | |
| 4,774,310 A | 9/1988 | Butler | |
| 4,842,902 A | 6/1989 | Brown | |
| 4,935,484 A | 6/1990 | Wolfgruber | |
| 5,026,890 A | 6/1991 | Webb | |
| 5,110,890 A | 5/1992 | Butler | |
| 5,214,119 A | 5/1993 | Leir | |
| 5,248,739 A | 9/1993 | Schmidt | |
| 5,262,558 A | 11/1993 | Kobayashi | |
| 5,276,122 A | 1/1994 | Aoki | |
| 5,302,685 A | 4/1994 | Tsumura | |
| 5,319,040 A | 6/1994 | Wengrovius | |
| 5,461,134 A | 10/1995 | Leir | |
| 5,512,650 A | 4/1996 | Leir | |
| 6,204,350 B1 | 3/2001 | Liu | |
| 6,355,759 B1 * | 3/2002 | Sherman et al. | 528/28 |
| 6,407,195 B2 | 6/2002 | Sherman | |
| 6,441,118 B2 * | 8/2002 | Sherman et al. | 528/28 |
| 6,531,620 B2 | 3/2003 | Brader | |
| 6,923,921 B2 | 8/2005 | Flynn | |
| 7,371,464 B2 * | 5/2008 | Sherman et al. | 428/447 |
| 7,501,184 B2 | 3/2009 | Leir | |
| 2006/0194067 A1 | 8/2006 | Beger | |
| 2007/0149745 A1 | 6/2007 | Leir | |
| 2008/0318065 A1 | 12/2008 | Sherman | |
| 2009/0042043 A1 | 2/2009 | Joseph | |
| 2011/0092638 A1 * | 4/2011 | Leir et al. | 524/588 |
| 2012/0259088 A1 * | 10/2012 | Iyer et al. | 528/343 |
| 2012/0271025 A1 * | 10/2012 | Hays et al. | 528/26 |
| 2012/0289736 A1 * | 11/2012 | Yang et al. | 560/168 |
| 2013/0012667 A1 * | 1/2013 | Hansen et al. | 525/477 |

FOREIGN PATENT DOCUMENTS

JP        2-36234        2/1990

OTHER PUBLICATIONS

"Encyclopedia of Polymer Science and Engineering," vol. 15, John Wiley & Sons, New York, (1989), pp. 265 to 270.
International Search Report for PCT International Application No. PCT/US2010/061260, Mailed Sep. 30, 2011, 4 pages.

* cited by examiner

*Primary Examiner* — Mike M Dollinger
(74) *Attorney, Agent, or Firm* — Jeffrey M. Olofson

(57) ABSTRACT

Siloxane-containing reactive compounds contain moisture-curable alkoxy-silane functional end groups and also contain fluorocarbon-containing segments. The siloxane-containing and fluorocarbon-containing reactive compounds may be prepared from siloxane-containing and fluorocarbon-containing oxamide compounds or amine compounds. Siloxane-containing and fluorocarbon-containing polymers may be prepared from the reactive compounds by reaction with water. The siloxane-containing and fluorocarbon-containing polymers may be release materials or adhesives.

20 Claims, No Drawings

MOISTURE-CURABLE SILOXANE-CONTAINING COMPOUNDS AND FLUOROCARBON-CONTAINING COMPOUNDS AND POLYMERS FORMED THEREFROM

CROSS REFERENCE TO RELATED APPLICATIONS

This application is a national stage filing under 35 U.S.C. 371 of PCT/US2010/061260, filed Dec. 20, 2010, which claims priority to U.S. Provisional Application No. 61/290,925, filed Dec. 30, 2009, the disclosure of which is incorporated by reference in its/their entirety herein.

FIELD OF THE DISCLOSURE

The present disclosure relates generally to reactive compounds, specifically moisture-curable siloxane-containing and fluorocarbon-containing compounds and polymers prepared from these reactive compounds.

BACKGROUND

Siloxane polymers have unique properties derived mainly from the physical and chemical characteristics of the siloxane bond. These properties include low glass transition temperature, thermal and oxidative stability, resistance to ultraviolet radiation, low surface energy and hydrophobicity, high permeability to many gases, and biocompatibility. The siloxane polymers, however, often lack tensile strength.

The low tensile strength of the siloxane polymers can be improved by forming block copolymers. Some block copolymers contain a "soft" siloxane polymeric block or segment and any of a variety of "hard" blocks or segments. Polydiorganosiloxane polyamides and polydiorganosiloxane polyureas are exemplary block copolymers.

Polydiorganosiloxane polyamides have been prepared by condensation reactions of amino terminated silicones with short-chained dicarboxylic acids. Alternatively, these copolymers have been prepared by condensation reactions of carboxy terminated silicones with short-chained diamines. Because polydiorganosiloxanes (e.g., polydimethylsiloxanes) and polyamides often have significantly different solubility parameters, it can be difficult to find reaction conditions for production of siloxane-based polyamides that result in high degrees of polymerization, particularly with larger homologs of the polyorganosiloxane segments. Many of the known siloxane-based polyamide copolymers contain relatively short segments of the polydiorganosiloxane (e.g., polydimethylsiloxane) such as segments having no greater than about 30 diorganosiloxy (e.g., dimethylsiloxy) units or the amount of the polydiorganosiloxane segment in the copolymer is relatively low. That is, the fraction (i.e., amount based on weight) of polydiorganosiloxane (e.g., polydimethylsiloxane) soft segments in the resulting copolymers tends to be low.

Polydiorganosiloxane polyureas are another type of block copolymer. Although these block copolymers have many desirable characteristics, some of them tend to degrade when subjected to elevated temperatures such as 250° C. or higher.

SUMMARY

Reactive compounds containing moisture-curable groups and methods of preparing the reactive compounds are presented. Additionally, polymers prepared from the moisture-curable reactive compounds and articles containing these polymers are also disclosed.

Reactive compounds described by the formula:

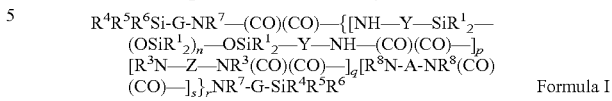

$$R^4R^5R^6Si\text{-}G\text{-}NR^7\text{---}(CO)(CO)\text{---}\{[NH\text{---}Y\text{---}SiR^1{}_2\text{---}(OSiR^1{}_2)_n\text{---}OSiR^1{}_2\text{---}Y\text{---}NH\text{---}(CO)(CO)\text{---}]_p[R^3N\text{---}Z\text{---}NR^3(CO)(CO)\text{---}]_q[R^8N\text{-}A\text{-}NR^8(CO)(CO)\text{---}]_s\}_r NR^7\text{-}G\text{-}SiR^4R^5R^6 \quad \text{Formula I}$$

are disclosed, wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; G is an alkylene or aralkylene group with from 1-10 carbon atoms; Z is an alkylene, aralkylene or heteroalkylene group; A is an divalent fluorocarbon-containing group; each $R^3$ is hydrogen or alkyl or $R^3$ taken together with Z and with the nitrogen to which they are both attached forms a heterocyclic group; each $R^8$ is hydrogen or alkyl; $R^4$, $R^5$, and $R^6$, are each independently an alkyl, aryl or alkoxy group with the proviso that at least one of $R^4$, $R^5$, and $R^6$ is an alkoxy group; each $R^7$ is independently a hydrogen, alkyl, aryl group or heteroalkyl group; n is independently an integer of 0 to 1500; p is an integer of 1 or greater: s is an integer of 1 or greater; q is an integer of 0 or greater; and r is an integer of 1 or greater.

Also disclosed are polymers that comprise the reaction product of a reaction mixture comprising a reactive compound with the formula of Formula I above and water. The reaction mixture may also comprise a moisture cure catalyst and/or a crosslinking agent.

Articles are also disclosed that comprise a substrate, and a polymer layer on the substrate, wherein the polymer comprises the reaction product of a reaction mixture comprising a reactive compound with the formula of Formula I above and water. In some embodiments, the polymer comprises a release material and the substrate comprises a film, a plate, an optical device or the surface of a cutting tool with a sharpened edge. In other embodiments, the polymer layer further comprises a tackifying resin and the substrate comprises a film, a plate, a tape backing, or a release liner.

DETAILED DESCRIPTION

Moisture-curable siloxane-containing and fluorocarbon-containing compounds and methods of preparing these moisture-curable compounds are presented. The moisture-curable compounds contain siloxane segments and fluorocarbon segments, and may also contain additional segments. The moisture-curable siloxane-containing and fluorocarbon-containing compounds may be readily prepared from a wide array of precursor molecules. The moisture-curable siloxane-containing and fluorocarbon-containing compounds can be used to prepare a wide variety of siloxane-containing and fluorocarbon-containing polymers. The siloxane-containing and fluorocarbon-containing polymers may be crosslinked or uncrosslinked, and may be elastomeric or release polymers. The elastomeric polymers can be used to prepare pressure sensitive adhesives by the addition of silicone tackifying resins. The polymers prepared from the moisture-curable siloxane-containing and fluorocarbon-containing compounds of this disclosure have many of the desirable features of polysiloxanes such as low glass transition temperatures, thermal and oxidative stability, resistance to ultraviolet radiation, low surface energy and hydrophobicity, and high permeability to many gases. Additionally, because the polymers are prepared from moisture-curable siloxane-containing compounds prepared from siloxane polyoxamides, the formed polymers can have improved mechanical strength and thermal stability due to these groups. Further, because the polymers additionally contain at least fluorocarbon-containing segments, the polymers have properties unattainable with siloxane polymers. In some embodiments, the polymers have desirable optical properties such as being optically clear or having a low refractive index or even a combination of these properties.

The terms "a", "an", and "the" are used interchangeably with "at least one" to mean one or more of the elements being described.

The term "siloxane-containing" as used herein refers to macromolecules that contain siloxane units. The terms siloxane and silicone are used interchangeably and refer to units with dialkyl or diaryl siloxane ($-SiR_2O-$) repeating units.

The term "fluorocarbon-containing" as used herein refers to macromolecules that contain fluorocarbon units, typically fluorocarbon repeat units. The fluorocarbon units are typically perfluorinated, meaning all hydrogens are replaced with fluorine atoms, and may be unsubstituted with heteroatoms such as $-(CF_2CF_2)_n-$ units or substituted with heteroatoms such as fluorinated polyethers with repeat units that may include, for example, $-(OCF_2CF_2)-$, $-(OCF_2CF_2CF_2)-$ or $-(OCF_2CF(CF_3))-$ repeat units.

The term "hydrocarbon-based" when referring to diamines and oxamide esters, refers to macromolecules containing alkylene and heteroalkylene groups, especially oxyalkylene groups.

The term "segmented compound" as used herein refers to a macromolecular compound comprising linked segments, each segment constitutes primarily a single structural unit or type of repeating unit. The segments may be arranged in any sequence. For example, the segmented compound X-$\{[D^1-]_a[D^2-]_b[D^3-]_c\}_d$—X, contains end capping groups X and repeating segments $D^1$, $D^2$ and $D^3$ that may be arranged in any order within the compound.

The term "adhesive" as used herein refers to polymeric compositions useful to adhere together two adherends. Examples of adhesives are heat activated adhesives, and pressure sensitive adhesives.

Heat activated adhesives are non-tacky at room temperature but become tacky and capable of bonding to a substrate at elevated temperatures. These adhesives usually have a glass transition temperature ($T_g$) or melting point ($T_m$) above room temperature. When the temperature is elevated above the $T_g$ or $T_m$, the storage modulus usually decreases and the adhesive become tacky.

Pressure sensitive adhesive compositions are well known to those of ordinary skill in the art to possess at room temperature properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "alkoxy" refers to a monovalent group of formula —OR where R is an alkyl group.

The term "alkoxycarbonyl" refers to a monovalent group of formula —(CO)OR where R is an alkyl group and (CO) denotes a carbonyl group with the carbon attached to the oxygen with a double bond.

The term "aralkyl" refers to a monovalent group of formula —$R^a$—Ar where $R^a$ is an alkylene and Ar is an aryl group. That is, the aralkyl is an alkyl substituted with an aryl.

The term "aralkylene" refers to a divalent group of formula —$R^a$—$Ar^a$— where $R^a$ is an alkylene and $Ar^a$ is an arylene (i.e., an alkylene is bonded to an arylene).

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "carbonyl" refers to a divalent group of formula —(CO)— where the carbon atom is attached to the oxygen atom with a double bond.

The term "halo" refers to fluoro, chloro, bromo, or iodo.

The term "haloalkyl" refers to an alkyl having at least one hydrogen atom replaced with a halo. Some haloalkyl groups are fluoroalkyl groups, chloroalkyl groups, or bromoalkyl groups.

The term "heteroalkylene" refers to a divalent group that includes at least two alkylene groups connected by a thio, oxy, or —NR— where R is alkyl. The heteroalkylene can be linear, branched, cyclic, or combinations thereof and can include up to 60 carbon atoms and up to 15 heteroatoms. In some embodiments, the heteroalkylene includes up to 50 carbon atoms, up to 40 carbon atoms, up to 30 carbon atoms, up to 20 carbon atoms, or up to 10 carbon atoms. Some heteroalkylenes are polyalkylene oxides where the heteroatom is oxygen. Heterofluoroalkylenes are fluorinated or perfluorinated heteroalkylenes, also called fluorinated or perfluorinated polyethers when the heteroatoms are oxygen, are heteroalkylenes where at least some or all (in the case of perfluorinated) of the hydrogens are replaced by fluorine atoms.

The term "oxamido ester" refers to a group of formula $R^aO$—(CO)—(CO)—$NR^b$— where each (CO) denotes a carbonyl, $R^a$ is an alkyl, haloalkyl, aryl, or aryl substituted with an alkyl, alkoxy, halo, or alkoxycarbonyl, or imino of formula —N=CR[10]R[11] where R[10] is hydrogen, alkyl, aralkyl, substituted aralkyl, aryl, or substituted aryl, and R[11] is alkyl, aralkyl, substituted aralkyl, aryl, or substituted aryl, and R[b] is hydrogen or an alkyl group.

The term "imino" refers to a group of formula —N=CR[10]R[11] where the R[10] group is hydrogen, alkyl, aralkyl, substituted aralkyl, aryl, or substituted aryl and the R[11] group is alkyl, aralkyl, substituted aralkyl, aryl, or substituted aryl.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The term "polydiorganosiloxane" refers to a divalent segment of formula

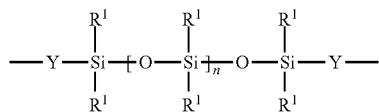

where each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and subscript n is independently an integer of 0 to 1500.

The terms "room temperature" and "ambient temperature" are used interchangeably to mean temperatures in the range of 20° C. to 25° C.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

The moisture-curable siloxane-containing and fluorocarbon-containing compounds of this disclosure are useful synthons for the preparation of wide range of siloxane-containing materials. The moisture-curable siloxane-containing and fluorocarbon-containing compounds may be described as oxamido compounds with terminal moisture-curable groups. Because of the moisture-reactivity of these compounds, in some embodiments it may be desirable to generate the moisture curable siloxane-containing and fluorocarbon-containing compounds in a reaction mixture and permit them to moisture cure to produce polymers rather than isolate the moisture-curable siloxane compounds and use them as polymer synthons.

The general structure of these moisture-curable siloxane-containing and fluorocarbon-containing compounds is described by Formula I below, which is a segmented compound in which the segments described by the subscripts p, q and s may be arranged in any sequence:

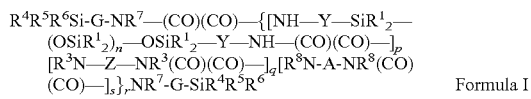

Formula I wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; G is an alkylene, aralkylene or heteroalkylene group with from 1-10 carbon atoms; Z is an alkylene, aralkylene or heteroalkylene group; A is an divalent fluorocarbon or heterofluorocarbon group; each $R^3$ is independently a hydrogen, alkyl, or aryl group or the $R^3$ groups taken together with Z and with the nitrogens to which they are attached forms a heterocyclic group; each $R^8$ is independently a hydrogen, alkyl, or aryl group; $R^4$, $R^5$, and $R^6$, are each independently an alkyl, aryl or alkoxy group with the proviso that at least one of $R^4$, $R^5$, and $R^6$ is an alkoxy group; each $R^7$ is independently a hydrogen, alkyl, aryl group or heteroalkyl group; n is independently an integer of 0 to 1500; p is an integer of 1 or greater; q is an integer of 0 or greater; s is an integer of 1 or greater; and r is an integer of 1 or greater.

Each $R^1$ is independently an alkyl, haloalkyl, aralkyl, alkenyl, aryl, or aryl substituted with an alkyl, alkoxy, or halo. Generally, at least 50% of the $R^1$ groups are methyl groups. Typically if some of the $R^1$ groups are not methyl groups they are phenyl groups or substituted aryl groups. In some embodiments, it is desirable to replace a portion of methyl groups in the siloxane backbone to effect a change in properties of the siloxane, especially the optical properties. Replacement of a substantial number of methyl groups with, for example, phenyl groups can raise the refractive index of polymers formed from these moisture-curable siloxanes. Due to the greater commercial availability of and relatively lower cost of siloxane starting materials in which all $R^1$ groups are methyl groups, many embodiments contain methyl groups for all, or essentially all $R^1$ groups.

Each Y is independently an alkylene, aralkylene, or a combination thereof. Generally, the Y groups are the same and are alkylene groups with from 1 to 10 carbon atoms. More typically, the Y groups are alkylene groups with 1-3 carbon atoms. Since the moisture-curable siloxanes are generally prepared from siloxane diamines in which the Y groups are propylene groups (—$CH_2CH_2CH_2$—), the Y groups in many embodiments are these groups.

Each $R^7$ is independently a hydrogen, an alkyl group with from 1 to 10 carbon atoms, an aryl group with from 1 to 10 carbon atoms, or a heteroalkyl group. When $R^7$ is a heteroalkyl group it can contain nitrogen or oxygen atoms.

Each $R^3$ is independently a hydrogen, an alkyl group with from 1 to 10 carbon atoms, an aryl group with from 1 to 10 carbon atoms, or the $R^3$ groups taken together with Z and with the nitrogens to which they are attached forms a heterocyclic group. Typically $R^3$ is a hydrogen or an alkyl group with from 1-3 carbon atoms.

Each $R^8$ is independently a hydrogen, an alkyl group with from 1 to 10 carbon atoms, or an aryl group with from 1 to 10 carbon atoms. Typically $R^8$ is a hydrogen or an alkyl group with from 1-3 carbon atoms.

The Group A is an divalent fluoroalkylene or heterofluoroalkylene group. Examples of fluoroalkylene groups A include, —B—($CF_2CF_2$)$_a$—B— groups, and heterofluoroalkylene groups include, for example, —B—($OCF_2CF_2$)$_a$—B—, and —B—($OCF_2CF(CF_3)$)$_a$—B— groups where each B is independently a linking group comprising an alkylene group with from 1-10 carbon atoms or heteroalkylene group containing one or more oxygen atoms and from 1-10 carbon atoms, or a carbonyl amino-containing group, and a is an integer of 1 or greater.

The group G is the residue of an amine molecule that is used to prepare the moisture-curable siloxane. G is generally an alkylene, aralkylene or heteroalkylene group with from 1-10 carbon atoms, more typically 1-5 carbon atoms. When G is a heteroalkylene group, the hetero atom may be oxygen or nitrogen. In one particular embodiment, the G group comprises a —(CH$_2$)$_2$—NH—(CH$_2$)$_3$— group. The group G links the N atom to the moisture-curable alkoxy silane group —SiR$^4$R$^5$R$^6$. The groups R$^4$, R$^5$, and R$^6$, are each independently an alkyl, aryl or alkoxy group with the proviso that at least one of R$^4$, R$^5$, and R$^6$ is an alkoxy group. Alkoxy silanes are subject to reaction with water to form silanol groups as shown in Reaction Scheme A. These silanol groups further condense to form —Si—O—Si— bonds. As can be seen from the reactions of Reaction Scheme A (wherein R and R$^c$ are alkyl, aralkyl or aryl groups) the overall transformation is catalytic in water (as much water is produced as is consumed) and generates an equivalent of an alcohol.

Reaction Scheme A

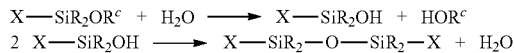

A wide variety of moisture-curable alkoxy silane groups —SiR$^4$R$^5$R$^6$ are possible. Generally there are two classes of moisture-curable alkoxy silane groups that are commercially, and therefore readily, available. In one class, two of the R$^4$, R$^5$, and R$^6$ groups are alkoxy groups and the other group is typically an alkyl or aryl group. In the other readily available class, the R$^4$, R$^5$, and R$^6$ groups are the same and therefore all are alkoxy groups. Typically, in embodiments of this disclosure, the R$^4$, R$^5$, and R$^6$ groups, whether they are alkyl or alkoxy groups, contain 1-10 carbon atoms, or 1-5 carbon atoms or even 1-3 carbon atoms. Examples of suitable moisture-curable alkoxy silane groups —SiR$^4$R$^5$R$^6$ include, —Si(OMe)$_3$, —Si(OEt)$_3$, —Si(OPr)$_3$, —Si(OMe)$_2$Me, —Si(OEt)$_2$Me, —Si(OMe)$_2$Et, —Si(OEt)$_2$Et, —Si(OPr)$_2$Me, and the like, where Me=methyl, Et=ethyl and Pr=propyl.

The subscript n is an integer of 0 to 1500. The value of n reflects the molecular weight of the siloxane portion of the moisture-curable siloxane compound. A wide range of n values are possible and available. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, or 1 to 20. The molecular weight of the siloxane segment of the moisture-curable siloxane-containing and fluorocarbon-containing compound greatly affects the final properties of polymers prepared from the moisture-curable siloxane-containing and fluorocarbon-containing compounds.

The subscript p is an integer of 1 or greater. In some embodiments, the value of p is in the range of 1 to 10. For example, the value of p is often an integer up to 9, up to 8, up to 7, up to 6, up to 5, up to 4, up to 3, or up to 2. In some embodiments, value of p can be in the range of 1 to 8, 1 to 6, or 1 to 4. In some embodiments the value of p is greater than 10.

The subscript q is an integer of 0 or greater. If the value of q is 0, the unit subtended by this value is not present in the compound. If the value of q is 1 or greater, the unit subtended by q is present. In some embodiments, the value of q is 1 to 10. The Z unit is an alkylene, aralkylene or heteroalkylene group. When Z is an alkylene or an aralkylene it typically has from 1-10 carbon atoms, more typically 1-6 carbon atoms. Examples of alkylene and aralkalene groups include methylene, ethylene, propylene, butylene, pentylene, benzylene and the like. When the Z group is a heteroalkylene group it is usually an oxyalkylene group. The Z group may also be a heterocyclic group incorporating the R$^3$ groups and the nitrogen atoms to which they are attached. An example of an amine that could generate a group is piperazine.

The subscript s is an integer of 1 or greater. In some embodiments, the value of s is in the range of 1 to 10. For example, the value of s is often an integer up to 9, up to 8, up to 7, up to 6, up to 5, up to 4, up to 3, or up to 2. In some embodiments, value of s can be in the range of 1 to 8, 1 to 6, or 1 to 4. In some embodiments the value of s is greater than 10.

The subscript r is an integer of 1 or greater In some embodiments, the value of r is in the range of 1 to 10. Typically the subscript r is an integer of 1 to 5, 1 to 3, or even 1 to 2. In other embodiments, the value of r may be larger than 10.

While Formula I shows a single structure, it should be understood that samples of moisture-curable siloxane-containing and fluorocarbon-containing compounds of this disclosure may contain more than one compound of Formula I, i.e. the moisture-curable siloxane-containing and fluorocarbon-containing compounds may be a mixture. Generally, mixtures of moisture-curable siloxane-containing and fluorocarbon-containing compounds result from precursor compounds that are mixtures, from reactions containing mixtures of amines, or both.

The moisture-curable siloxane-containing and fluorocarbon-containing compounds of Formula I can be prepared from a variety of starting materials, and the selection of these starting materials greatly impacts the properties of the moisture-curable siloxane-containing and fluorocarbon-containing compounds and of polymers made from them. The moisture-curable siloxane and fluorocarbon-containing compounds are prepared from the reaction of an oxamido ester terminated siloxane-containing and fluorocarbon-containing compound with an amine containing a moisture-curable group. The general structure of these oxamido ester siloxane-containing and fluorocarbon-containing compounds is described by Formula Ia below, which is a segmented compound in which the segments described by the subscripts p, q and s may be arranged in any sequence:

R$^2$O—(CO)(CO)—{[NH—Y—SiR$^1$$_2$—(OSiR$^1$$_2$)$_n$—OSiR$^1$$_2$—Y—NH—(CO)(CO)—]$_p$[R$^3$N—Z—NR$^3$(CO)(CO)—]$_q$[R$^8$N-A-NR$^8$(CO)(CO)—]$_s$},OR$^2$    Formula Ia wherein R$^1$, R$^3$, R$^8$, Y, A, Z, n, p, s, q, and r are as previously defined and each group R$^2$ is independently an alkyl, haloalkyl, aryl, or aryl substituted with an alkyl, alkoxy, halo, alkoxycarbonyl, or imino of formula —N═CR$^{10}$R$^{11}$ where R$^{10}$ is hydrogen, alkyl, aralkyl, substituted aralkyl, aryl, or substituted aryl, and R$^{11}$ is alkyl, aralkyl, substituted aralkyl, aryl, or substituted aryl. Suitable alkyl and haloalkyl groups for R$^2$ often have 1 to 10, 1 to 6, or 1 to 4 carbon atoms. Although tertiary alkyl (e.g., tert-butyl) and haloalkyl groups can be used, there is often a primary or secondary carbon atom attached directly (i.e., bonded) to the adjacent oxy group. Exemplary alkyl groups include methyl, ethyl, n-propyl, iso-propyl, n-butyl, and iso-butyl. Exemplary haloalkyl groups include chloroalkyl groups and fluoroalkyl groups in which some, but not all, of the hydrogen atoms on the corresponding alkyl group are replaced with halo atoms. For example, the chloroalkyl or a fluoroalkyl groups can be chloromethyl, 2-chloroethyl, 2,2,2-trichloroethyl, 3-chloropropyl, 4-chlorobutyl, fluoromethyl, 2-fluoroethyl, 2,2,2-trifluoroethyl, 3-fluoropropyl, 4-fluorobutyl, and the like. Suitable aryl groups for R$^2$ include those having 6 to 12 carbon atoms such as, for example, phenyl. An aryl group can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), or alkoxycarbonyl (e.g., an alkoxycarbonyl having 2 to 5 carbon atoms such as methoxycarbonyl, ethoxycarbonyl, or propoxycarbonyl). Suitable imino groups of formula —N=$CR^{10}R^{11}$ are ones where $R^{10}$ and $R^{11}$ are alkyl groups that are linear or branched and typically contain 1 to 10 carbon atoms, 1 to 8 carbon atoms, 1 to 6 carbon atoms, or 1 to 4 carbon atoms or aryl, substituted aryl, aralkyl, and substituted aralkyl groups with from 6 to 12 carbon atoms. Especially suitable groups $R^2$ include alkyls having 1 to 4 carbon atoms, haloalkyls having 1 to 4 carbon atoms, phenyl, and imino.

A wide variety of synthetic pathways can be used to prepare the compound of Formula Ia. Each of the synthetic pathways uses amines such as diamines and oxalates to generate oxamido ester linkages and oxamido ester terminal groups. In some synthetic pathways, a building block approach is followed in which a diamine is reacted with a molar excess of oxalate to generate an oxamido ester terminated compound. The general reaction may be described by reaction Scheme B, below:

Reaction Scheme B

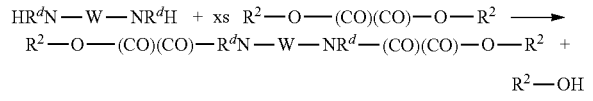

wherein $R^d$ is hydrogen or an alkyl group, W is a siloxane-containing, fluorocarbon-containing, or hydrocarbon-based group, and $R^2$ is as previously defined.

The thus formed oxamido ester terminated compound can be further reacted with diamines or a combination of diamines and oxamido ester terminated compounds to generate the oxamido ester compound of Formula I.

The diamine starting materials for preparing the moisture-curable siloxane-containing and fluorocarbon-containing compounds of Formula I can be classified as belonging to one of three general classes: siloxane diamines such as polydimethyl siloxane diamines; fluorocarbon-containing diamines such as perfluoropolyether diamines; and hydrocarbon-based diamines such as alkylene diamines and heteroalkylene diamines.

The oxamido ester compound of Formula I comprises a siloxane segment based upon a siloxane diamine, such as a polydiorganosiloxane diamine of general formula: $H_2N$—Y—$SiR^1{}_2$—$(OSiR^1{}_2)_n$—$OSiR^1{}_2$—Y—$NH_2$. These diamines can be prepared by any known method and can have any suitable molecular weight, such as an average molecular weight in the range of 700 to 150,000 g/mole. Suitable polydiorganosiloxane diamines and methods of making the polydiorganosiloxane diamines are described, for example, in U.S. Pat. Nos. 3,890,269 (Martin), 4,661,577 (Jo Lane et al.), 5,026,890 (Webb et al.), 5,276,122 (Aoki et al.), 5,214,119 (Leir et al.), 5,461,134 (Leir et al.), 5,512,650 (Leir et al.), and 6,355,759 (Sherman et al.). Some polydiorganosiloxane diamines are commercially available, for example, from Shin Etsu Silicones of America, Inc., Torrance, Calif., from Wacker Silicones, Adrian, Mich., and from Gelest Inc., Morrisville, Pa.

Another method of preparing polydiorganosiloxane diamines is described in U.S. Pat. No. 6,531,620 (Brader et al.). In this method, a cyclic silazane is reacted with a siloxane material having hydroxy end groups as shown in the following reaction.

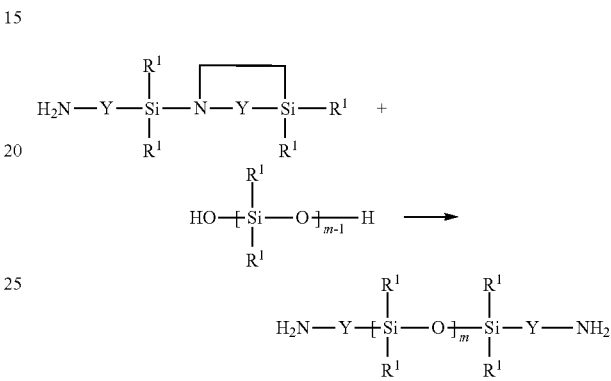

The groups $R^1$ and Y are the same as described for Formula I. The subscript m is an integer greater than 1.

The polydiorganosiloxane diamine may be used as is or it may be reacted with an oxalate to generate an oxamido ester terminated siloxane compound. Typically, an oxamido ester terminated siloxane compound is used. The general structure of the oxamido ester terminated siloxane is described by Formula II below:

Formula II

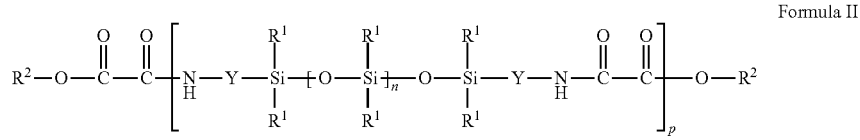

wherein $R^1$, Y, n, p and $R^2$ are as described previously.

The oxamido ester of Formula II can include a single compound (i.e., all the compounds have the same value of p and n) or can include a plurality of compounds (i.e., the compounds have different values for p, different values for n, or different values for both p and n). Compounds having a p value of at least 2 are chain extended.

In some embodiments, the oxamido ester is a mixture of a first compound of Formula II with subscript p equal to 1 and a second compound of Formula II with subscript p equal to at least 2. The first compound can include a plurality of different compounds with different values of n. The second compound can include a plurality of compounds with different values of p, different values of n, or different values of both p and n. Mixtures can include at least 50 weight percent of the first compound of Formula II (i.e., p is equal to 1) and no greater than 50 weight percent of the second compound of Formula II (i.e., p is equal to at least 2) based on the sum of the weight of the first and second compounds in the mixture. In some mixtures, the first compound is present in an amount of at least 55 weight percent, at least 60 weight percent, at least 65 weight percent, at least 70 weight percent, at least 75 weight percent, at least 80 weight percent, at least 85 weight percent, at least 90 weight percent, at least 95 weight percent, or at least 98 weight percent based on the total amount of the compounds of Formula II. The mixtures often contain no greater than 50 weight percent, no greater than 45 weight percent, no greater than 40 weight percent, no greater than 35 weight percent, no greater than 30 weight percent, no greater than 25 weight percent, no greater than 20 weight percent, no greater than 15 weight percent, no greater than 10 weight percent, no greater than 5 weight percent, or no greater than 2 weight percent of the second compound.

Different amounts of the chain-extended compound of Formula II in the mixture can affect the properties of the compounds of Formula I and of polymers prepared from the compounds of Formula I. That is, the amount of the second compound of Formula II (i.e., p equal to at least 2) can be varied advantageously to provide elastomeric materials with a range of properties. For example, a higher amount of the second compound of Formula II can alter the melt rheology (e.g., the elastomeric material can flow easier when present as a melt), alter the softness of the elastomeric material, lower the modulus of the elastomeric material, or a combination thereof.

The polydiorganosiloxane-containing precursor of Formula II can be prepared by any known method. In some embodiments, this precursor is prepared according to Reaction Scheme B$^1$.

ments, the group $R^F$ may contain heteroatoms, such as oxygen, and therefore are oxyfluoroalkylenes or fluorocarbon polyethers.

Examples of suitable fluoroalkylene diamines include ones where B is an alkylene or heteroalkylene group and a is an integer of 3-6, such as for example, $H_2N-(CH_2)_2-(CF_2CF_2)_3-(CH_2)_2-NH_2$.

Examples of suitable fluorocarbon polyether diamines include ones in which the group $R^F$ includes a segment of formula $-(C_xF_{2x}O)_y-$ where x is an integer in the range of 1 to 10 and y is an integer equal to at least 2. The integer x is often in the range of 1 to 8, in the range of 1 to 6, in the range of 1 to 4, in the range of 2 to 4, equal to 3, or equal to 4. The integer y is often at least 3, at least 4, at least 8, at least 12, at least 16, at least 20, at least 30, at least 40, or at least 50. In some specific perfluoropolyether groups, x is equal to 3 and the perfluoropolyether group includes a hexafluoropropylene oxide segment. That is, $R^F$ often includes a segment of formula $-(C_3F_6O)_y-$ and each $-C_3F_6O-$ group in the segment can be linear or branched.

Some exemplary $R^F$ groups are of formula

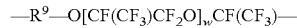

here $R^9$ is a perfluoroalkylene group having 1 to 20 carbon atoms, 1 to 10 carbon atoms, 1 to 8 carbon atoms, 1 to 6 carbon atoms, 1 to 5 carbon atoms, or 1 to 4 carbon atoms. The subscript w is an integer in the range of 1 to 35, in the range of 1 to 30, in the range of 1 to 20, in the range of 1 to 10, or in the range of 1 to 5.

Reaction Scheme B$^1$

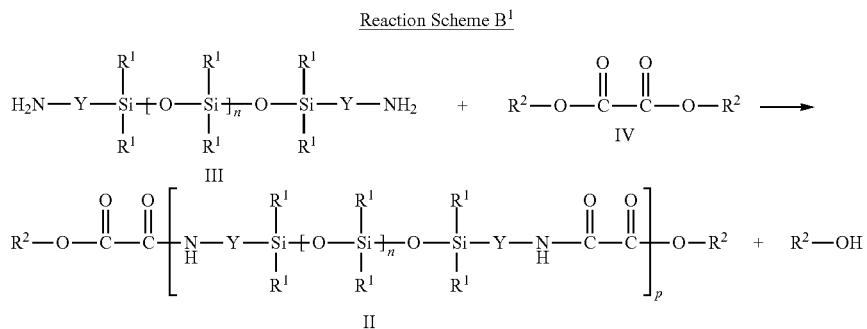

A polydiorganosiloxane diamine of Formula III is reacted with a molar excess of an oxalate of Formula IV under an inert atmosphere to produce the polydiorganosiloxane-containing precursor of Formula II and $R^2-OH$ by-product. In this reaction, $R^1$, $R^2$, Y, n, and p are the same as previously described. The preparation of the oxamido ester terminated siloxane of Formula II according to Reaction Scheme B$^1$ is further described in US Patent Publication No. 2007/0149745 (Leir et al.) and U.S. Pat. No. 7,501,184 (Leir et al.).

A second class of diamine materials suitable for the preparation of the moisture-curable siloxane-containing and fluorocarbon-containing compound of Formula I are fluorocarbon-containing diamines. A wide variety of fluorocarbon-containing diamines are suitable which can be described by the general formula $HR^8N-B-R^F-B-NR^8H$, where B and $R^8$ are the same as previously described, and $R^F$ comprises a fluorocarbon containing group. In some embodiments, the group $R^F$ is a fluoroalkylene group of the type $-(CF_2CF_2)_a-$, where the subscript a is an integer of about 2-10, in some embodiments 3-6 or even 3-4. In other embodi- Other exemplary $R^F$ groups are of formula

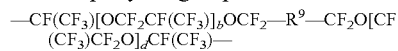

where $R^9$ is as defined above and the subscripts b and d are both integers with a sum in the range of 0 to 35, in the range of 1 to 35, in the range of 2 to 35, in the range of 0 to 30, in the range of 1 to 30, in the range of 2 to 30, in the range of 0 to 20, in the range of 1 to 20, in the range of 2 to 20, in the range of 0 to 10, in the range of 1 to 20, or in the range of 2 to 10.

Yet other exemplary $R^F$ groups are of formula

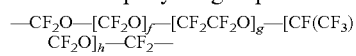

where the variables f, g, and h are integers with a sum in the range of 0 to 35, in the range of 1 to 35, in the range of 2 to 35, in the range of 3 to 35, in the range of 3 to 30, in the range of 3 to 20, in the range of 3 to 15, or in the range of 3 to 10.

Still other exemplary $R^F$ groups are of one of the following formulas

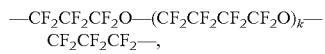
$-CF_2CF_2CF_2O-(CF_2CF_2CF_2O)_k-$
$CF_2CF_2CF_2-$, where k is a variable in the range of 0 to 35, in the range of 1 to 30, in the range of 1 to 30, in the range of 1 to 20, in the range of 1 to 15, or in the range of 1 to 10.

In some embodiments, the linking groups B in the general formula for the fluorocarbon-containing diamine, $HR^8N-B-R^F-B-NR^8H$, are alkylene groups with from 2-20 carbon atoms or heteroalkylene groups with from 2-20 carbon atoms and 1-4 heteroatoms, typically oxygen. More typically, the alkylene B groups contain from 2-4, 2-6 or 2-10 carbon atoms and heteroalkylene B groups contain from 2-4, 2-6 or 2-10 carbon atoms and 1, 2 or 3 oxygen atoms.

In some embodiments, the formula for the fluorocarbon-containing diamine comprises, $HR^8N-B^1-R^8N(CO)-B^2-R^F-B^2-(CO)NR^8-B^1-NR^8H$, where $R^F$, $R^8$ are as previously defined, (CO) is a carbonyl group, each $B^1$ is independently an alkylene or a heteroalkylene and each $B^2$ is independently a single bond, an alkylene, or a heteroalkylene.

Some of the fluorocarbon-containing diamines can be prepared using a method described, for example, in U.S. Pat. No. 3,250,807 (Fritz et al.) where the fluorinated amines can be prepared by forming a compound of formula $X-R^F-X$. In this formula, group X refers to a carbonyl-containing group such as an alkoxycarbonyl or halocarbonyl. For example, an initiating fluorinated diacid such as perfluorosuccinyl fluoride can be reacted with hexafluoropropylene oxide in bis(2-methoxyethyl)ether (i.e., diglyme) with a catalytic amount of potassium fluoride. This compound $X-R^F-X$ can then be reacted with a diamine of formula $R^8HN-B^1-NHR^8$ to prepare the fluorinated amines of the general formula, $HR^8N-B^1-R^8N(CO)-B^2-R^F-B^2-(CO)NR^8-B^1-NR^8H$, with $B^2$ being a single bond.

Additional synthetic pathways to fluorocarbon-containing diamines are also possible. For example, to prepare a compound of formula $R^F-(CH_2OC_3H_6NH_2)_2$, a compound of formula $R^F-(COF)_2$ can be reduced to $R^F-(CH_2OH)_2$. Acrylonitrile can then be added to the compound of formula $R^F-(CH_2OH)_2$ to give a compound of formula $R^F-(CH_2OC_2H_4CN)_2$. $R^F-(CH_2OC_2H_4CN)_2$ can then be reduced with hydrogen in the presence of ammonia and a platinum catalyst to form a compound of formula $R^F-(CH_2OC_3H_6NH_2)_2$.

To prepare a compound of formula $R^F-(CH_2OC_2H_4NH_2)_2$, a compound of formula $R^F-(COF)_2$ can be reduced to $R^F-(CH_2OH)_2$. The compound $R^F-(CH_2OH)_2$ can then be reacted with ethylene carbonate to form a compound of formula $R^F-(CH_2OC_2H_4OH)_2$. This compound can then be reacted with methanesulfonyl chloride to form a compound of formula $R^F-(CH_2OC_2H_4OSO_2CH_3)_2$. The compound $R^F-(CH_2OC_2H_4OSO_2CH_3)_2$ can be reacted with liquid ammonia to form $R^F-(CH_2OC_2H_4NH_2)_2$.

To prepare a compound of formula $R^F-(C_2H_4NH_2)_2$, a compound of formula $R^F-(COF)_2$ can be reacted with lithium iodide. The product can be further reacted with liquid ammonia to form $R^F-C_2H_4NH_2$.

To prepare a compound of formula $R^F-(CH_2NH_2)_2$, a compound of formula $R^F-S(COF)_2$ can be reacted with ammonia to form $R^F-(CONH_2)_2$ and then reduced with $BH_3$ to $R^F-(CH_2NH_2)_2$. An alternative synthesis method is described in Example XIV of U.S. Pat. No. 3,810,874 (Mitsch et al.).

The fluorocarbon-containing diamine may be used as is or it may be reacted with an oxalate to generate an oxamido ester terminated compound according to general Reaction Scheme B or the more specific Reaction Scheme $B^2$ below.

Reaction Scheme $B^2$

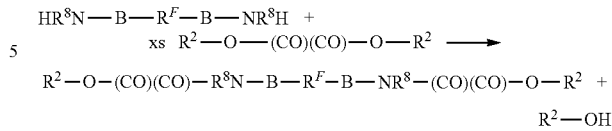

$HR^8N-B-R^F-B-NR^8H +$
$xs\ R^2-O-(CO)(CO)-O-R^2 \longrightarrow$
$R^2-O-(CO)(CO)-R^8N-B-R^F-B-NR^8-(CO)(CO)-O-R^2 +$
$R^2-OH$ where B, $R^8$, $R^2$, and $R^F$ are as previously defined.

A third class of diamine materials suitable for the preparation of the moisture-curable siloxane-containing and fluorocarbon-containing compound of Formula I are hydrocarbon-based diamines of general formula $HR^3N-Z-NHR^3$ where $R^3$ and Z are as previously defined. While it may be desirable to include hydrocarbon-based diamines of general formula $HR^3N-Z-NHR^3$ in the moisture-curable siloxane-containing and fluorocarbon-containing compound of Formula I, the use of these materials is optional. This class includes alkylene, arylene and heteroalkylene diamines. Especially suitable are alkylene diamines and polyoxyalkylene diamines.

In some embodiments the hydrocarbon-based diamine of general formula $HR^3N-Z-NHR^3$ is an alkylene diamine. Suitable alkylene diamines are ones which contain 2-12 carbon atoms, more typically 2-10, 2-6 or even 2-4 carbon atoms. Examples of suitable diamines include, but are not limited to, ethylene diamine, propylene diamine, butylene diamine, hexylene diamine, and the like.

In some embodiments the polyamines are polyoxyalkylene diamines. Such diamines are also sometimes referred to as polyether diamines. The polyoxyalkylene diamine may be, for example, a polyoxyethylene diamine, polyoxypropylene diamine, polyoxytetramethylene diamine, or mixtures thereof. Many polyoxyalkylene diamines are commercially available. For example, polyoxyalkylene diamines are available under trade designations such as D-230, D-400, D-2000, D-4000, DU-700, ED-600, ED-900, ED-2003, EDR-148, XTJ-542, XTJ-548, and XTJ-559 (available from Huntsman Chemical; Houston, Tex. under the family trade designation JEFFAMINE).

The hydrocarbon-based diamine may be used as is or it may be reacted with an oxalate to generate an oxamido ester terminated compound according to Reaction Scheme B. Typically, if used, the hydrocarbon-based diamine is used as the diamine, but in some embodiments an oxamido ester terminated compound has been formed as shown in Reaction Scheme $B^3$ below:

Reaction Scheme $B^3$

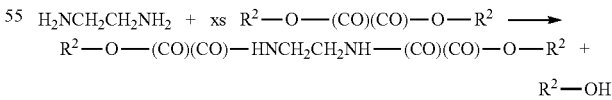

$H_2NCH_2CH_2NH_2 + xs\ R^2-O-(CO)(CO)-O-R^2 \longrightarrow$
$R^2-O-(CO)(CO)-HNCH_2CH_2NH-(CO)(CO)-O-R^2 +$
$R^2-OH$ wherein $R^2$ is as previously defined. In some embodiments, the hydrocarbon-based diamine of the type $HR^3N-Z-NHR^3$ may be used as chain extension agents for the oxamido ester terminated siloxane of Formula II. The result of this chain extension reaction is an oxamido ester terminated siloxane-containing compound of Formula V as is shown in Reaction Scheme C below:

Reaction Scheme C

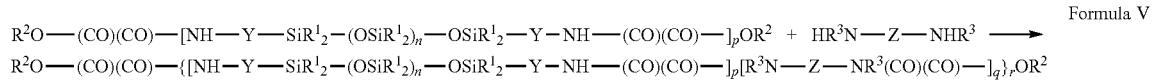

wherein $R^1$, $R^3$, $R^2$, Y, Z, n, p, q, and r are as previously defined. The oxamido ester terminated siloxane-containing compound of Formula V can then be reacted further with a fluorocarbon-containing diamine to generate the oxamido ester terminated siloxane-containing and fluorocarbon-containing compound of Formula Ia. Whether such a chain extension agent or chain extension agents are used and the amounts of such agents used is determined by the properties desired for the moisture curable siloxane-containing and fluorocarbon-containing compounds formed as well as for the properties of polymers formed from these compounds. For example, when incorporation of short chain alkylene diamine chain extension agents with 1-5 carbon atoms into moisture curable siloxane compounds, can increase the stiffness of polymers formed from such compounds relative to polymers formed from moisture curable siloxane compounds that do not incorporate the chain extension agents.

In alternative embodiments, the hydrocarbon-based diamine of the type $HR^3N$—Z—$NHR^3$ may be used as a chain extension agent for the oxamido ester terminated fluorocarbon-containing oxamido ester of general formula $R^2$—O—(CO)(CO)—$R^8N$—B—$R^F$—B—$NR^8$—(CO)(CO)—O—$R^2$, where B, $R^8$, $R^2$, and $R^F$ are as previously defined. The result of this chain extension reaction is an oxamido ester terminated fluorocarbon-containing compound of Formula VI as is shown in Reaction Scheme D below:

The general structure of amines containing a moisture-curable group is described by Formula VII below:

$$HR^7N\text{-}G\text{-}SiR^4R^5R^6 \quad \text{Formula VII}$$

wherein the groups $R^4$, $R^5$, $R^6$, $R^7$ and G are as previously defined. In some embodiments, $R^7$ is hydrogen, or an alkyl or aryl group with 1-6 carbon atoms; G is an alkylene group with 1-10 carbon atoms, 1-5 carbon atoms or 1-3 carbon atoms or a heteroalkylene with 1-10 carbon atoms and a nitrogen heteroatom; and the moisture-curable alkoxy silane groups —$SiR^3R^4R^5$ include, —$Si(OMe)_3$, —$Si(OEt)_3$, —$Si(OPr)_3$, —$Si(OMe)_2Me$, —$Si(OEt)_2Me$, —$Si(OMe)_2Et$, —$Si(OEt)_2Et$, —$Si(OPr)_2Me$, and the like, where Me=methyl, Et=ethyl and Pr=propyl. Examples of suitable amines containing a moisture-curable group include members of the SILQUEST family of compounds commercially available from Momentive Performance Materials, Albany N.Y., such as, for example: $H_2N(CH_2)_3Si(OEt)_3$ commercially available as SILQUEST A-1100; $H_2N(CH_2)_3Si(OMe)_3$ commercially available as SILQUEST A-1110; $H(Et)NCH_2CH(Me)CH_2Si(OMe)_3$ commercially available as SILQUEST A-LINK 15; $H_2N(CH_2)_2NH(CH_2)_3Si(OMe)_2Me$ commercially available as SILQUEST A-2120; and $H(Ph)N(CH_2)_3Si(OMe)_3$ (where Ph=phenyl) commercially available as SILQUEST Y-9669.

The condensation reaction of the compound of Formula Ia with 2 equivalents of amine containing a moisture-curable group typically is conducted at room temperature, but the reaction may be conducted at elevated temperatures such as at temperatures up to about 250° C. More typically, the reaction

Reaction Scheme D

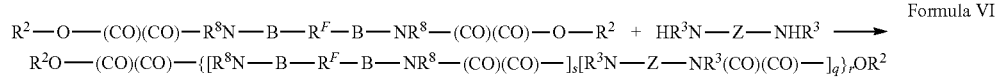

wherein $R^3$, $R^2$, $R^8$, $R^F$, B, Z, s, q, and r are as previously defined. The oxamido ester terminated fluorocarbon-containing compound of Formula VI can then be reacted further with a siloxane diamine to generate the oxamido ester terminated siloxane-containing and fluorocarbon-containing compound of Formula Ia.

Additional pathways are also available to form the oxamido ester terminated siloxane-containing and fluorocarbon-containing compound of Formula Ia as alternatives to the building block approaches described above. For example siloxane diamine, fluorocarbon-containing diamine and optional hydrocarbon-based diamine can be mixed together with a molar excess of an oxalate to generate an oxamido ester terminated siloxane-containing and fluorocarbon-containing compound of Formula Ia by a one pot synthesis.

However formed, the oxamido ester terminated siloxane-containing and fluorocarbon-containing compound of Formula Ia can be reacted with at least 2 equivalents of an amine containing a moisture-curable group to generate the moisture-curable siloxane-containing and fluorocarbon-containing compound of Formula I.

may be conducted at room temperature or at temperatures up to about 100° C. In some embodiments, a combination of reaction temperatures are used, for example, the reaction temperature may be elevated for a period and room temperature for a period. The condensation reaction is often complete in less than 1 hour, in less than 2 hours, in less than 4 hours, in less than 8 hours, or in less than 12 hours.

An alternative synthetic pathway can also be used to prepare the moisture-curable compound of Formula I, in which an amine-functional siloxane-containing and fluorocarbon-containing compound is reacted with an oxamide-functional compound containing a moisture-curable group.

The amine-functional siloxane-containing and fluorocarbon-containing compound can be described by the general formula Ib below, which is a segmented compound in which the segments described by the subscripts p, q, and s may be arranged in any sequence:

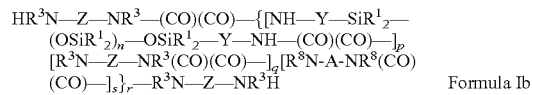

wherein $R^1$, $R^3$, $R^8$, Y, A, Z, n, p, s, q, and r are as previously defined. The compound of Formula Ib can be prepared from the compound of Formula Ia by reaction with 2 equivalents of a diamine of the type $HR^3N\text{---}Z\text{---}NR^3H$ which was previously described as a chain extension agent. However, when the diamine is present in greater than a stoichoimetric excess and reaction conditions are maintained where the diamine is always present in excess, the diamine can act as a chain termination agent instead of a chain extension agent. One technique for effecting this reaction is to add the oxamide of Formula Ia to a rapidly stirred solution or neat mixture of greater than a stoichoimetric excess of diamine. Typically, low molecular weight diamines are used which permit easy removal of the excess diamine upon completion of the reaction. In some embodiments, the diamine contains a Z group which is a short chain alkyl group such as ethylene, propylene or butylene and each $R^3$ is a hydrogen.

The amine-capped oxamide of Formula Ib can be reacted with an oxamide-functional compound containing a moisture-curable group. The oxamide-functional compound containing a moisture-curable group can be generally represented by Formula VIII below:

$R^2\text{---}O\text{---}(CO)\text{---}(CO)\text{---}R^7N\text{-G-}SiR^4R^5R^6$      Formula VIII wherein the groups $R^2$, $R^4$, $R^5$, $R^6$, $R^7$ and G are as previously defined and ---(CO)--- represents a carbonyl group C=O. Such a compound may be prepared by reacting a compound of Formula VII with an oxalate of Formula IV.

The reaction of an amine-functional siloxane-containing and fluorocarbon-containing compound of Formula Ib with an oxamide-functional compound with a moisture-curable group of Formula VII gives a moisture-curable siloxane of Formula I.

The reaction to form the moisture-curable siloxane-containing and fluorocarbon-containing compound of Formula I can occur in the presence or absence of a solvent. Suitable solvents usually do not react with any of the reactants or products of the reactions. Additionally, suitable solvents are usually capable of maintaining all the reactants and all of the products in solution throughout the polymerization process. Exemplary solvents include, but are not limited to, toluene, tetrahydrofuran, dichloromethane, aliphatic hydrocarbons (e.g., alkanes such as hexane), esters (such as ethyl acetate) or mixtures thereof.

Any solvent that is present can be stripped from the resulting moisture-curable siloxane at the completion of the reaction. Solvents that can be removed under the same conditions used to remove the alcohol by-product are often preferred. The stripping process is often conducted at a temperature of at least 100° C., at least 125° C., or at least 150° C. The stripping process is typically at a temperature less than 300° C., less than 250° C., or less than 225° C.

Conducting the reaction to form the compound of Formula I in the absence of a solvent can be desirable because only the volatile by-product, $R^2OH$, needs to be removed at the conclusion of the reaction.

Any suitable reactor or process can be used to prepare the compound of Formula I. The reaction can be conducted using a batch process, semi-batch process, or a continuous process. Typically the compound of Formula I is prepared in a batch process. The batch process can be conducted in virtually any reaction vessel equipped with agitation device capable of stirring fluids. The reaction vessels may be glass, glass lined metal or metal, typically the vessels are glass. Suitable agitation devices include mechanical stirrers, magnetic stirrers, shaker tables, rotation racks, rollers, Brabender mixers and the like. Examples of suitable reaction vessels included stirred flasks, shaken flasks or bottles, rotated flasks or bottles, and the like. Exemplary semi-batch process can be conducted in a continuously stirred tube, tank, or fluidized bed. Exemplary continuous processes can be conducted in a single screw or twin screw extruder such as a wiped surface counter-rotating or co-rotating twin screw extruder.

As mentioned previously, due to the moisture-reactivity of the moisture-curable siloxane-containing and fluorocarbon-containing compounds, in some embodiments it may be desirable to prepare the moisture-curable siloxane-containing and fluorocarbon-containing compound in a reaction mixture and proceed to curing the moisture-curable siloxane without isolating the siloxane compound.

The moisture-curable siloxane-containing and fluorocarbon-containing compounds described by Formula I may be used to provide polymeric materials. Typically the moisture-curable terminal groups of the compounds are used to incorporate the compounds into polymers.

A variety of different polymers may be prepared with the moisture-curable siloxane-containing and fluorocarbon-containing compounds of this disclosure. Typically the polymers formed are elastomeric in nature, even if crosslinked. The moisture-curable siloxane-containing and fluorocarbon-containing compounds may be allowed to self-condense (i.e. the moisture-curable siloxane-containing and fluorocarbon-containing compound is the only moisture-reactive compound present), or additional moisture-curable or silanol-reactive groups may be present.

The moisture curing reaction of the moisture-curable siloxane compounds was shown in Reaction Scheme A, above. In this scheme, the terminal moisture-curable groups react with water to generate Si---OH groups. These Si---OH groups condense with other Si---OH groups to generate Si---O---Si linkages. Because the reaction produces as much water as is consumed, only very small quantities of water are needed to produce this curing. Often ambient humidity (that is to say the amount of moisture present in the air) is sufficient to effect this curing reaction. In some embodiments it may be desirable to utilize ambient humidity to cure the moisture-curable compounds of this disclosure and generate siloxane-based polymers. In other embodiments, it may be desirable to add measured amounts of water to cure the moisture-curable compounds of this disclosure and generate polymers.

The polymers may be generated as free standing films, or as layers or coatings on substrates. The methods used to produce the polymers will vary depending upon the nature and desired use of the formed polymer.

Generally the polymers are prepared by preparing a reactive mixture containing the moisture-curable siloxane-containing and fluorocarbon-containing compound, coating the reactive mixture onto a substrate and permitting the mixture to moisture cure and form the polymer. The reactive mixture may comprise the moisture-curable siloxane-containing and fluorocarbon-containing compound, or it may contain precursor molecules which upon reaction form the moisture-curable siloxane-containing and fluorocarbon-containing compound. When the reactive mixture comprises the moisture-curable siloxane-containing and fluorocarbon-containing compound, it may also include a variety of additives. The additives may include reactive additives or non-reactive additives, reactive in this sense meaning that the additive contains moisture-curable or silanol-reactive groups. Examples of reactive additives include, for example, curing agents and catalysts such as water and the catalysts described below, crosslinking agents, and the like. Examples of non-reactive additives include, for example, solvents or a variety of property modifying agents such as tackifying agents, plasticizing agents, fillers or reinforcing agents, and the like.

When the reactive mixture contains molecules that upon reaction form the moisture-curable siloxane-containing and fluorocarbon-containing compound, the reactive mixture may include a variety of oxamido ester terminated compounds, a variety of amine-functional molecules including diamines and amines containing a moisture-curable group as described by Formula VII. Additionally, other amine-functional molecules may be included, such as monoamines that can function as chain termination agents, and triamines or other greater than difunctional amines that can function as branching agents. Like the above described reactive mixtures containing pre-formed moisture-curable siloxane-containing and fluorocarbon-containing compounds, these reactive mixtures can also contain a variety of additives. The additives may be added to the reactive mixture when the reactive mixture is formed, or the additives may be added later, allowing time for the moisture-curing siloxane compound to form in the reactive mixture. In particular, if reactive additives are added, reactive in this sense meaning that the additive contains moisture-curable or silanol-reactive groups, it may be desirable to not add them immediately to the reactive mixture such that the moisture curing reaction does not compete with the reaction to form the moisture-curable siloxane-containing and fluorocarbon-containing compound.

As described above, reactive mixtures used to prepare moisture cured polymers may contain a variety of reactive additives. These reactive additives include water, curing catalysts, crosslinking agents, and other silanol-reactive or moisture-curable compounds. As discussed above, measured amounts of water may be added to the reactive mixture to effect the moisture curing reaction, but typically ambient moisture is sufficient to achieve the desired curing without the addition of additional water.

It may be desirable to add a moisture cure catalyst to facilitate the moisture curing reaction. Examples of suitable catalysts include acids, anhydrides, tertiary amines, and organometallic compounds. Examples of acids include, for example organic acids trichloroacetic acid. Examples of anhydrides include, for example, trichloroacetic anhydride. Examples of organometallic compounds include, for example, aluminum-based, bismuth-based, tin-based, vanadium-based, zinc-based, or zirconium-based catalysts. Tin-based catalysts are particularly useful. Most desirable are dibutyl tin compounds, such as dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, and dibutyltin oxide. In particular, the dibutyltin dilaurate catalyst DABCO T-12, commercially available from Air Products and Chemicals, Inc., Allentown, Pa. is particularly suitable. The catalyst is generally included at levels of at least 1,000 ppm or greater.

It may desirable to add crosslinking agents or other silanol-reactive or moisture-curable compounds to the reactive mixture. Examples of suitable crosslinking agents include, for example, compounds with multiple silanol-reactive groups such as tetraalkoxy silanes. An example of a commercially available tetraalkoxy silane is tetraethoxy silane (TEOS). Examples of other silanol-reactive or moisture-curable compounds include, for example particles such as nanoparticles that contain silanol, alkoxy silane, or hydroxyl surface groups. These particles include silica particles as well as particles that have been coated with silica, silanols or alkoxy silanes and particles with, for example Al—OH surface groups. Generally, if used, crosslinking agents or other silanol-reactive or moisture-curable compounds are used in fairly low concentrations such as 1-5 weight %. Additionally, the moisture-curable groups can co-react with, for example, Si—OH, Al—OH or other metal oxides or hydroxide surface groups to form strong bonds between the surface and the formed moisture cured polymer. Examples of suitable surfaces, besides the silica particles described above, include surfaces of glass, quartz, mica, talc and inorganic oxide surfaces such as aluminum, copper or iron oxides.

In addition to the reactive compounds present in the reactive mixture, a variety of non-reactive additives may also be present. Examples of non-reactive additives include, for example, solvents or a variety of property modifying agents such as tackifying agents, plasticizing agents, fillers or reinforcing agents, colorants, and performance additives such as, for example, antistatic agents. The term solvents, as used herein, refers to transient liquid media which are present in the reactive mixture but are not reactive with the reactive ingredients and generally are not present, or are not intended to be present, in the final cured polymer. Solvents may be present to aid in the mixing of the reactive and/or non-reactive components, to help to dissipate the heat of reaction, to facilitate the processing of the reactive mixture (such as to provide a coatable viscosity) or for a combination of these reasons. Examples of suitable solvents include: ethers such as diethyl ether, tetrahydrofuran, and tert-butyl methyl ether; ketones such as acetone and methyl ethyl ketone; hydrocarbons such as hexane, heptane, benzene and toluene; esters such as ethyl acetate; and halocarbons such as dichloromethane, and carbon tetrachloride; and mixtures thereof.

In some embodiments, the formed polymer is a free standing film. Such free standing films can be prepared by preparing a reactive mixture and coating or casting the reaction mixture onto a release substrate. A variety of release substrates are suitable, including, for example, release liners and substrates with a release surface. Examples of substrates with a release surface include, for example, trays prepared from low surface energy polymers like polytetrafluoroethylene (TEFLON) or polyolefins like polyethylene or polypropylene or with low surface energy coatings upon them. The reaction mixture may be 100% solids or it may be a solution. Typically if solvents are used, the preparation of the coatings or castings may include a drying step that can utilize elevated temperatures (such as by the use of a drying oven) or reduced pressures (such as by the use of a vacuum oven or autoclave) or a combination thereof. In some embodiments the reaction mixture comprises the moisture-curable siloxane compound and a catalyst. The catalyst may comprise an organometallic catalyst such as dibutyltin dilaurate. While water can be added to accelerate the curing reaction, in many embodiments, ambient water is used to cure the moisture-curable siloxane compound. Depending upon the ambient atmospheric moisture content, the curing may be permitted to occur over relatively long periods of time, such as days, or relatively short periods of time, such as hours. The use of ambient conditions that are controlled and reproducible, such as a constant temperature and humidity controlled room or chamber can be desirable for ensuring consistent curing.

In other embodiments, the reaction mixture is cast or coated onto a substrate and permitted to cure on the substrate. This process is often described as a "cast and cure" process. A variety of substrates can be coated with the reaction mixture, including both flexible (such as films) and non-flexible substrates (such as glass or metal plates, surfaces of articles and the like). In some embodiments, the cast and cure process may be desirable for a variety of reasons. In some instances it may be desirable to form a very thin layer of moisture cured polymer and it may be impractical or even impossible to prepare such thin coatings as free standing films. Additionally, casting and curing on a substrate can provide excellent anchorage of the coating to the substrate without needing any additional layers, such as adhesive layers, interposed between the coating and the substrate surface. Because the moisture curing reaction typically can occur at room temperature without requiring additional input of heat or radiation, it may be possible to cast and cure coatings onto thermally sensitive or fragile substrates without causing damage to the substrates.

The polymers formed by moisture curing of the moisture-curable compound of Formula I can be used to form a variety of different articles. In some embodiments the moisture cured polymer is a coating or layer on a substrate or film and provides a low surface energy layer. Examples of articles that utilize a low surface energy layer of cured siloxane polymer include releasing substrates such as release liners and low adhesion backsizes (LABs).

Release liners may be prepared using the moisture-cured polymers of the present disclosure by coating and curing mixtures containing the moisture-curable compounds of this disclosure on a substrate such as a film or paper. Release liners are articles containing at least one release surface. A release surface is defined as one that has a lack of adhesion, which provides an easy release from substrates, in particular adhesive coated substrates. When applied to an adhesive coated surface, release liners adhere only lightly and are easily removed. A wide range of release liners are known, many of which are multi-layer articles with a carrier layer (which may be, for example, paper, polymeric film, etc) and a release coating on the carrier layer. Generally release liners are used in constructions to provide temporary protection of an adhesive coated surface to prevent premature adhesion and/or contamination of the adhesive surface.

In some embodiments, the release liner may optionally be structured, and the structure on the release liner can be used to create an inverse of the structure on an adhesive, resulting in a structured adhesive. For example, for every groove in the adhesive, the release liner has a corresponding ridge. The ridges would protrude from a liner reference plane, which is defined by the liner surface at the base of each ridge. The dimensions of each ridge correspond to the desired dimensions of each groove in the adhesive. For example, the groove width at the reference plane corresponds to the ridge width at the liner reference plane. In embodiments comprising a protrusion from the reference plane or from the real walls on the adhesive structured surface, the release liner will comprise a corresponding depression. The structure on the release liner can be created in a number of known ways, including embossing the liner to form a structured surface or printing a structure on the surface.

Besides use as release liners, the moisture curable compounds of this disclosure can also be used to prepare releasing layers for adhesive-coated articles such as tapes. Tapes typically contain a backing with an adhesive coated on one side and a release coating on the opposite side. Thus when the tape is rolled up the adhesive contacts the release coating permitting the tape to be unrolled again when used. The release coatings on tapes are sometimes called "low adhesion backsizes" or "LABs". The moisture-cured polymers of this disclosure may function as LABs.

To prepare a tape, a mixture comprising the moisture-curable compounds of this disclosure can be coated onto a tape backing and cured to form the LAB coating. The tape backing can then be coated on the side opposite to the LAB coating with an adhesive coating. This coating may be applied with solvent-borne (either in solvent or water) or solventless (such as, for example, hot melt coating). Such techniques are commonly used in the preparation of tapes.

The adhesive may be any suitable adhesive, but typically will be a pressure sensitive adhesive. Examples of suitable pressure sensitive adhesives include, for example: acrylate- and methacrylate-based pressure sensitive adhesives; natural rubber-based pressure sensitive adhesives; synthetic rubber-based pressure sensitive adhesives; olefin-based pressure sensitive adhesives; block copolymer-based pressure sensitive adhesives such as styrene-isoprene block copolymers for example; vinyl ether-based pressure sensitive adhesives; and polyurethane- or polyurea-based pressure sensitive adhesives. Mixtures of these pressure sensitive adhesives may also be used in some embodiments. Generally the adhesive is chosen based upon the desired use of the tape, as well as other factors such as cost, ease of handling and release performance of the adhesive with the LAB coating.

Another example of an article that may contain a layer of moisture-cured polymer include cutting implements with a sharpened edge. The low surface energy coating prevents materials to be cut from sticking to the cutting implement. Examples of cutting implements with a sharpened edge include scissors, shears, knives, blades, saws and the like. The coating can be attached to the cutting implement either by preparing a free standing film of the moisture cured siloxane-containing and fluorocarbon-containing polymer and adhering the film to the blade or by coating and curing a reaction mixture containing the moisture-curable compound of Formula I and other optional components onto the blade and permitting the polymer to cure in place (a cast and cure process). In some embodiments, the cast and cure process may be particularly suitable to generate very thin coatings and to facilitate anchorage of the cured siloxane-containing and fluorocarbon-containing polymer layer to the blade.

The moisture cured siloxane-containing and fluorocarbon-containing polymer can be used to prepare siloxane-based adhesives such as a heat activated adhesives or a pressure sensitive adhesives by the addition of one or more tackifying resins, such as a silicone tackifying resin, to the moisture cured siloxane-containing and fluorocarbon-containing polymer. Suitable silicone tackifying resins include MQ tackifying resins. The MQ tackifying resin and the moisture cured siloxane-containing and fluorocarbon-containing polymer generally are present in the form of a blend of MQ tackifying resin and silicone polymer. Typically the siloxane polymer is present in the siloxane-based pressure sensitive adhesive composition in an amount of from about 30% by weight to about 90% by weight, 30% by weight to 85% by weight, 30% by weight to 70% by weight, or even 45% by weight to 55% by weight. The MQ tackifying resin, if present, is typically present in an amount of at least 10% by weight. In some embodiments, the MQ tackifying resin is present in the siloxane-based pressure sensitive adhesive composition in an amount of from about 15% by weight to about 70% by weight, from about 30% by weight to about 70% by weight, or from about 40% by weight to about 60% by weight, or even 45% by weight to 55% by weight.

Useful MQ tackifying resins include, e.g., MQ silicone resins, MQD silicone resins, and MQT silicone resins, which also may be referred to as copolymeric silicone resins and which typically have a number average molecular weight of about 100 to about 50,000, or about 500 to about 20,000 and generally have methyl substituents. The MQ silicone resins include both non-functional and functional resins, the functional resins having one or more functionalities including, for example, silicon-bonded hydrogen, silicon-bonded alkenyl, and silanol.

MQ silicone resins are copolymeric silicone resins having $R'_3SiO_{1/2}$ units (M units) and $SiO_{4/2}$ units (Q units). Such resins are described in, for example, Encyclopedia of Polymer Science and Engineering, vol. 15, John Wiley & Sons, New York, (1989), pp. 265 to 270, and U.S. Pat. Nos. 2,676,182; 3,627,851; 3,772,247; and 5,248,739. MQ silicone resins having functional groups are described in U.S. Pat. No. 4,774,310, which describes silyl hydride groups, U.S. Pat. No. 5,262,558, which describes vinyl and trifluoropropyl groups, and U.S. Pat. No. 4,707,531, which describes silyl hydride and vinyl groups. The above-described resins are generally prepared in solvent. Dried or solventless MQ silicone resins are prepared as described in U.S. Pat. Nos. 5,319,040; 5,302,685; and 4,935,484.

MQD silicone resins are terpolymers having $R'_3SiO_{1/2}$ units (M units), $SiO_{4/2}$ units (Q units), and $R'_2SiO_{2/2}$ units (D units) as described, e.g., in U.S. Pat. No. 5,110,890 and Japanese Kokai HEI 2-36234.

MQT silicone resins are terpolymers having $R_3SiO_{1/2}$ units (M units), $SiO_{4/2}$ units (Q units), and $RSiO_{3/2}$ units (T units) (MQT resins).

Commercially available MQ resins include SR-545 MQ resin in toluene available from General Electric Co., Silicone Resins Division (Waterford, N.Y.), MQOH resins which are MQ silicone resins in toluene available from PCR, Inc. (Gainesville, Fla.). Such resins are generally supplied in organic solvent. These organic solutions of MQ silicone resin may be used as is or may be dried by any number of techniques known in the art including, e.g., spray drying, oven drying, and steam separation, to provide a MQ silicone resin at 100 percent non-volatile content. The MQ silicone resin can also include blends of two or more silicone resins. Some MQ silicone resins may be obtained commercially as dry powders such as, for example, WACKER-BELSIL TMS-803 from Wacker Chemie.

The siloxane-based pressure sensitive adhesive compositions may be prepared by a variety of processes. Typically the compositions are prepared by adding the MQ silicone resin before the moisture cured siloxane-containing and fluorocarbon-containing polymer is formed. In some embodiments, a moisture-curable composition is prepared comprising the moisture-curable siloxane-containing and fluorocarbon-containing compound as described above. To this curable composition is added the MQ silicone resin and the mixture is then coated and cured. The moisture-curable siloxane-containing and fluorocarbon-containing compound and the MQ silicone resin can be mixed utilizing a variety of mixing techniques, including both solvent-based and solventless processes. Typically, the moisture-curable siloxane-containing and fluorocarbon-containing compound and the MQ silicone resin are mixed in solventless processes. In some embodiments, the moisture-curable siloxane-containing and fluorocarbon-containing compound and the MQ silicone resin are mixed using melt blending devices.

After mixing, the moisture curable siloxane-containing and fluorocarbon-containing compound and the MQ silicone resin mixture can be coated on a substrate. Suitable coating techniques include techniques such as, for example, die coating, knife coating, roll coating, gravure coating, rod coating, curtain coating, air knife coating and printing techniques such as screen printing or inkjet printing. The substrate may be a release liner, a rigid surface, a tape backing, a film, or a sheet. The tape backing can include single layer or multi-layer constructions. Useful backings include, for example, metal foils, polymeric films, including porous films, papers, polymeric foams, non-woven backings, cloth backings, and the like. Representative examples of potentially useful polymeric backing materials include polyolefins, e.g., polyethylene, including high density polyethylene, low density polyethylene, linear low density polyethylene, and linear ultra low density polyethylene, polypropylene and polybutylenes; vinyl copolymers, e.g., polyvinyl chlorides, both plasticized and unplasticized, and polyvinyl acetates; olefin copolymers, e.g., ethylene/methacrylate copolymers, ethylene/vinylacetate copolymers, acrylonitrile-butadiene-styrene copolymers, and ethylene/propylene copolymers; acrylic polymers and copolymer; and combinations thereof.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| PDMS diamine | A polydimethylsiloxane diamine with a number average molecular weight of about 5,000 g/mole (5K), prepared according to U.S. Pat. No. 5,214,119. |
| MCA-1 | Moisture-curable amine-2, commercially available from Momentive Performance Materials, Albany NY as SILQUEST A-1110, with the formula: $H_2N\diagdown\diagup\diagdown Si(OCH_3)_3$. |
| EDA | Ethylenediamine |
| HFPO-DME | Dimethyl ester of poly(hexafluoropropylene oxide), MeO(CO)—HFPO—(CO)OMe, with an approximate molecular weight of 1,714, prepared as described in U.S. Pat. No. 6,923,921 (Flynn et al.). |

Test Methods
Contact Angle Measurements:

Contact angles with water were measured using a VCA-2500XE video contact angle apparatus. Reported values are averages of measurements on the left and right sides of at least three drops. Drop volumes were 5 microliters for static measurements, and 1-3 microliters for advancing and receding measurements.

Preparative Examples

Preparative Example A

Preparation of 5,000 MW Oxamido Ester Terminated Siloxane

Diethyl oxalate (250 grams) was placed in a 3 liter, 2-part resin flask equipped with a mechanical stirrer, heating mantle, nitrogen inlet tube (with stopcock), and an outlet tube. 5K PDMS diamine (2,000.00 grams) was added slowly with stirring. The flask was purged with nitrogen for 15 minutes. The contents were stirred and heated to 150° C. under vacuum (133 Pascals, 1 Torr) for 4 hours, until no further distillate was able to be collected. The remaining liquid was cooled to room temperature to provide an oxamido ester terminated siloxane compound of Formula II. Gas chromatographic analysis of the clear, mobile liquid showed that no detectable level of diethyl oxalate remained. Equivalent weight was determined by back titration with ethanolamine to be 2,550 grams/equivalent.

Preparative Example B

Preparation of Fluorocarbon-Containing Diamine
$H_2NCH_2CH_2$—NH(CO)—HFPO—(CO)NH—$CH_2CH_2NH_2$ In a 500 mL round bottom flask that was equipped with a magnetic stir bar and a $N_2$ inlet was placed HFPO-DME (50 grams, 0.029 moles) and EDA (69.6 grams, 1.16 moles) under a $N_2$ atmosphere. The reaction mixture was stirred under a $N_2$ atmosphere for 12 hours and the progress of the reaction was monitored by IR spectroscopy. After the disappearance of the ester peak at 1792 cm$^{-1}$ and the appearance of the NH—C=O peak at 1719 cm$^{-1}$, the reaction mixture was poured onto a separation funnel and the lower portion was collected in a flask and dried under high vacuum for 8 hours to yield a viscous oil.

Preparative Example C

Preparation of Oxamido Ester Terminated Siloxane-Containing and Fluorocarbon-Containing Compound In a glass jar, a sample of the Fluorocarbon-Containing Diamine prepared in Preparative Example B (5 grams, 0.0028 moles, 1 equivalent) was mixed with a sample of the 5,000 MW Oxamido Ester Terminated Siloxane prepared in Preparative Example A (19.39 grams, 0.0056 moles, 2 equivalents) and the resulting mixture was mixed on a roller for one day at room temperature. Ethanol from the reaction mixture was evaporated by using a rotary evaporator. Toluene (48 grams) was added and the resultant mixture was stirred for 2 hours at room temperature to generate a 50 wt % in toluene solution.

Examples

Example 1 and Comparative Example C1

For Example 1 a moisture-curable siloxane-containing and fluorocarbon-containing compound was prepared, coated on an aluminum substrate and cured. A sample of the solution from Preparative Example C (10 grams of the 50 wt % toluene solution, 0.00058 moles) was mixed with MCA-1 (0.233 grams, 0.0013 moles) in a glass jar and the resulting mixture was mixed on a roller for one day. The resultant solution was diluted to a 1 wt % solution in toluene. An aluminum substrate was washed with acetone and dried at room temperature. The aluminum substrate was dipped in the 1 wt % solution in toluene for 15 minutes at room temperature, the aluminum substrate was removed from the solution, washed with toluene and placed in a 140° C. oven for 45 minutes. Contact Angle Measurements were made using the Test Method described above. The results are shown in Table 1. For Comparative Example C1 an aluminum substrate was dip coated as described above with the mixture prepared in Preparative Example A and Contact Angle Measurements were made using the Test Method described above. The results are shown in Table 1.

Comparative Example C2

For Comparative Example C2 a moisture-curable fluorocarbon-containing compound was prepared, coated on an aluminum substrate and cured. A round bottom flask that was equipped with a magnetic stir bar and a $N_2$ inlet was charged with HFPO-DME (50 grams, 0.029 moles) and MCA-1 (10.324 grams, 0.058 moles) under a $N_2$ atmosphere. The reaction mixture was stirred under a $N_2$ atmosphere for 12 hours and the progress of the reaction was monitored by IR spectroscopy. After the disappearance of the ester peak at 1792 cm$^{-1}$ and appearance of the NH—C=O peak at 1719 cm$^{-1}$, the reaction mixture was collected in a flask and dried under high vacuum for 8 hours. The resultant solution was diluted to a 1 wt % solution in toluene. An aluminum substrate was dip coated as described above and Contact Angle Measurements were made using the Test Method described above. The results are shown in Table 1.

TABLE 1

| | Water Contact Angle (°) | | |
|---|---|---|---|
| Example | Static | Advancing | Receding |
| C1 | 105 | 109 | 85 |
| C2 | 110 | 116 | 97 |
| 1 | 114 | 120 | 96 |

What is claimed is:

1. A reactive compound comprising the formula:

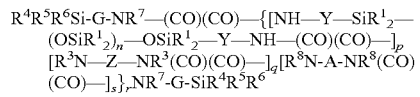

wherein each $R^1$ is independently an alkyl, haloalkyl, aralkyl, alkenyl, aryl, or aryl substituted with an alkyl, alkoxy, or halo;

each Y is independently an alkylene, aralkylene, or a combination thereof;

G is an alkylene or aralkylene group with from 1-10 carbon atoms;

Z is an alkylene, aralkylene or heteroalkylene group;

A is an divalent fluorocarbon-containing group;

each $R^3$ is hydrogen or alkyl or $R^3$ taken together with Z and with the nitrogen to which they are both attached forms a heterocyclic group;

each $R^8$ is hydrogen or alkyl;

$R^4$, $R^5$, and $R^6$, are each independently an alkyl, aryl or alkoxy group with the proviso that at least one of $R^4$, $R^5$, and $R^6$ is an alkoxy group;

each $R^7$ is independently a hydrogen, alkyl, aryl group or heteroalkyl group;

n is independently an integer of 0 to 1500;

p is an integer of 1 or greater;

s is an integer of 1 or greater;

q is an integer of 0 or greater; and r is an integer of 1 or greater.

2. The reactive compound of claim 1, wherein at least 50 percent of the $R^1$ groups are methyl.

3. The reactive compound of claim 1, wherein Y is an alkylene having 1 to 4 carbon atoms.

4. The reactive compound of claim 1, wherein n is at least 40.

5. The reactive compound of claim 1, wherein $R^4$, $R^5$, $R^6$ comprise alkoxy groups with 1-6 carbon atoms.

6. The reactive compound of claim 1, wherein A comprises a group of the type —B—$R^F$—B—, wherein each B is independently a linking group comprising an alkylene group with from 1-10 carbon atoms or heteroalkylene group containing one or more oxygen atoms and from 1-10 carbon atoms, or a carbonyl amino-containing group; and $R^F$ is a fluoroalkylene group or heterofluoroalkylene group.

7. The reactive compound of claim 6, wherein $R^F$ comprises:

—(CF$_2$CF$_2$)$_a$—,

—R$^9$—O—[CF(CF$_3$)CF$_2$O]$_w$CF(CF$_3$)—

—CF(CF$_3$)[OCF$_2$CF(CF$_3$)]$_b$OCF$_2$—R$^9$—CF$_2$O[CF(CF$_3$)CF$_2$O]$_d$CF(CF$_3$)—

—CF$_2$O—[CF$_2$O]$_f$—[CF$_2$CF$_2$O]$_g$—[CF(CF$_3$)CF$_2$O]$_h$—CF$_2$—

—CF$_2$O—(CF$_2$CF$_2$O)$_k$—CF$_2$—,

—CF$_2$CF$_2$O—(CF$_2$CF$_2$CF$_2$O)$_k$—CF$_2$CF$_2$—, or

—CF$_2$CF$_2$CF$_2$O—(CF$_2$CF$_2$CF$_2$CF$_2$O)$_k$—CF$_2$CF$_2$CF$_2$—, wherein a is an integer of 2 to 10;
$R^9$ is a perfluoroalkylene group having 1 to 20 carbon atoms; and
w, b, d, f, g, h and k are each independently integers in the range of 0 to 35.

8. The reactive compound of claim 6, wherein —B—$R^F$—B— comprises the formula

—B$^1$—R$^8$N(CO)—B$^2$—$R^F$—B$^2$—(CO)NR$^8$—B$^1$—, wherein $R^F$ is a fluoroalkylene group or heterofluoroalkylene group:
each $R^8$ is hydrogen or alkyl;
each $B^1$ is independently an alkylene or a heteroalkylene; and
each $B^2$ is independently a single bond, an alkylene, or a heteroalkylene.

9. A polymer comprising the reaction product of a reaction mixture comprising:
a reactive compound with the formula:

R$^4$R$^5$R$^6$Si-G-NR$^7$—(CO)(CO)—{[NH—Y—SiR$^1$$_2$—(OSiR$^1$$_2$)$_n$—OSiR$^1$$_2$—Y—NH—(CO)(CO)—]$_p$[R$^3$N—Z—NR$^3$(CO)(CO)—]$_q$[R$^8$N-A-NR$^8$(CO)(CO)—]$_s$}$_r$NR$^7$-G-SiR$^4$R$^5$R$^6$ wherein each $R^1$ is independently an alkyl, haloalkyl, aralkyl, alkenyl, aryl, or aryl substituted with an alkyl, alkoxy, or halo;
each Y is independently an alkylene, aralkylene, or a combination thereof;
G is an alkylene or aralkylene group with from 1-10 carbon atoms;
Z is an alkylene, aralkylene or heteroalkylene group;
A is an divalent fluorocarbon-containing group;
each $R^3$ is hydrogen or alkyl or $R^3$ taken together with Z and with the nitrogen to which they are both attached forms a heterocyclic group;
each $R^8$ is hydrogen or alkyl;
$R^4$, $R^5$, and $R^6$, are each independently an alkyl, aryl or alkoxy group with the proviso that at least one of $R^4$, $R^5$, and $R^6$ is an alkoxy group;
each $R^7$ is independently a hydrogen, alkyl, aryl group or heteroalkyl group;
n is independently an integer of 0 to 1500;
p is an integer of 1 or greater:
s is an integer of 1 or greater;
q is an integer of 0 or greater; and
r is an integer of 1 or greater; and
water.

10. The polymer of claim 9, wherein the reactive compound comprises n is at least 40.

11. The polymer of claim 9, wherein $R^4$, $R^5$, $R^6$ comprise alkoxy groups with 1-6 carbon atoms.

12. The polymer of claim 9, wherein the reaction mixture further comprises a moisture cure catalyst, wherein the moisture cure catalyst comprises: an acid, an anhydride, an organo-tin compound, a tertiary amine, or combination thereof.

13. The polymer of claim 9, wherein the polymer comprises a release material.

14. The polymer of claim 9, further comprising a tackifying resin to form a pressure sensitive adhesive.

15. The polymer of claim 9, further comprising a crosslinking agent, wherein the crosslinking agent comprises:
a polyfunctional alkoxy silane, a silica nanoparticle, or a nanoparticle comprising multiple hydroxyl groups on the surface.

16. An article comprising:
a substrate; and
a polymer layer on the substrate, wherein the polymer comprises the reaction product of a reaction mixture comprising:
a reactive compound with the formula:

R$^4$R$^5$R$^6$Si-G-NR$^7$—(CO)(CO)—{[NH—Y—SiR$^1$$_2$—(OSiR$^1$$_2$)$_n$—OSiR$^1$$_2$—Y—NH—(CO)(CO)—]$_p$[R$^3$N—Z—NR$^3$(CO)(CO)—]$_q$[R$^8$N-A-NR$^8$(CO)(CO)—]$_s$}$_r$NR$^7$-G-SiR$^4$R$^5$R$^6$ wherein each $R^1$ is independently an alkyl, haloalkyl, aralkyl, alkenyl, aryl, or aryl substituted with an alkyl, alkoxy, or halo;
each Y is independently an alkylene, aralkylene, or a combination thereof
G is an alkylene or aralkylene group with from 1-10 carbon atoms;
Z is an alkylene, aralkylene or heteroalkylene group;
A is an divalent fluorocarbon group;
each $R^3$ is hydrogen or alkyl or $R^3$ taken together with Z and with the nitrogen to which they are both attached forms a heterocyclic group;
each $R^8$ is hydrogen or alkyl;
$R^4$, $R^5$, and $R^6$, are each independently an alkyl, aryl or alkoxy group with the proviso that at least one of $R^4$, $R^5$, and $R^6$ is an alkoxy group;
each $R^7$ is independently a hydrogen, alkyl, aryl group or heteroalkyl group;
n is independently an integer of 0 to 1500;
p is an integer of 1 or greater:
s is an integer of 1 or greater;
q is an integer of 0 or greater; and
r is an integer of 1 or greater; and
water.

17. The article of claim 16, wherein the polymer comprises a release material.

18. The article of claim 16, wherein the substrate comprises:
a film, a plate, an optical device, or the surface of a cutting tool with a sharpened edge.

19. The article of claim 18, wherein the cutting tool comprises scissors, a knife, a machine blade, or a saw.

20. The article of claim 16, wherein the polymer layer further comprises a tackifying resin.

* * * * *

UNITED STATES PATENT AND TRADEMARK OFFICE
CERTIFICATE OF CORRECTION

PATENT NO. : 8,609,787 B2
APPLICATION NO. : 13/518460
DATED : December 17, 2013
INVENTOR(S) : Richard Hansen et al.

Page 1 of 1

It is certified that error appears in the above-identified patent and that said Letters Patent is hereby corrected as shown below:

In the Specification

Column 17
Line 6, Delete "stoichoimetric" and insert -- stoichiometric --, therefor.
Line 12, Delete "stoichoimetric" and insert -- stoichiometric --, therefor.

Column 24
Line 47, Delete "microlilters" and insert -- microliters --, therefor.

Signed and Sealed this
Tenth Day of March, 2015

Michelle K. Lee
*Deputy Director of the United States Patent and Trademark Office*